US010375783B2

(12) United States Patent
Matsui et al.

(10) Patent No.: US 10,375,783 B2
(45) Date of Patent: Aug. 6, 2019

(54) LIGHTING CIRCUIT AND VEHICULAR LAMP

(71) Applicant: Koito Manufacturing Co., Ltd., Tokyo (JP)

(72) Inventors: Kotaro Matsui, Shizuoka (JP); Yasushi Noyori, Shizuoka (JP); Shinji Ohta, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/659,937

(22) Filed: Jul. 26, 2017

(65) Prior Publication Data

US 2018/0049286 A1 Feb. 15, 2018

(30) Foreign Application Priority Data

Aug. 10, 2016 (JP) ................................ 2016-157522

(51) Int. Cl.

*H05B 33/00* (2006.01)
*H05B 33/08* (2006.01)
*B60Q 1/14* (2006.01)

(52) U.S. Cl.

CPC ....... *H05B 33/0842* (2013.01); *B60Q 1/1407* (2013.01); *H05B 33/083* (2013.01); *H05B 33/0824* (2013.01); *H05B 33/0827* (2013.01); *H05B 33/0845* (2013.01)

(58) Field of Classification Search

CPC ............ H05B 37/0272; H05B 33/0815; H05B 33/083; H05B 37/0227; H05B 33/0845; H05B 37/0281; H05B 33/0803; H05B 37/0218; H05B 33/089; H05B 33/0854; H05B 33/0872; H05B 33/0887; H05B 33/0824

See application file for complete search history.

(56) References Cited

U.S. PATENT DOCUMENTS

2015/0069908 A1* 3/2015 Fukui ................ H05B 33/0815 315/82

FOREIGN PATENT DOCUMENTS

CN 102378443 A 3/2012
CN 204131809 U 1/2015
JP 2001028461 A 1/2001
JP 2006-103404 A 4/2006

OTHER PUBLICATIONS

An Office Action dated Dec. 3, 2018, issued from the Chinese State Intellectual Property Office of the P.R.C (SIPO) of Chinese Patent Application No. 201710679569.9 and a EN translation thereof.

* cited by examiner

*Primary Examiner* — Monica C King

(74) *Attorney, Agent, or Firm* — Abelman, Frayne & Schwab

(57) ABSTRACT

Provided is a lighting circuit that drives a first light source and a second light source connected in series with each other. A bypass switch is provided in parallel with the second light source. A constant current circuit is connected in parallel with one of the first light source and the second light source. A drive circuit supplies a drive current to a serially-connected circuit of the first light source and the second light source.

14 Claims, 6 Drawing Sheets

LIGHTING CIRCUIT AND VEHICULAR LAMP

CROSS-REFERENCE TO RELATED APPLICATIONS

This application is based on and claims priority from Japanese Patent Application No. 2016-157522, filed on Aug. 10, 2016, with the Japanese Patent Office, the disclosure of which is incorporated herein in its entirety by reference.

TECHNICAL FIELD

The present disclosure relates to a lamp used for a vehicle or the like.

BACKGROUND

In the related art, halogen lamps or high intensity discharge (HID) lamps have been mainly used as light sources for vehicular lamps, in particular headlights, but recently, vehicular lamps using semiconductor light sources such as, for example, light emitting diodes (LEDs) or semiconductor laser diodes (LDs) are being developed instead of such lamps.

A vehicular lamp is mounted with a plurality of light sources of which the on/off is individually controlled. For example, a light source for a low beam and a light source for a high beam may be mounted on the vehicular lamps. FIGS. 1A to 1C are circuit diagrams of a vehicular lamp including a plurality of light sources studied by the present inventors. In each figure, a first light source 302 corresponds to a low beam and a second light source 304 corresponds to a high beam.

A lighting circuit 400R of a vehicular lamp 300R illustrated in FIG. 1A includes a first drive circuit 410 and a second drive circuit 412 that correspond to the first light source 302 and the second light source 304, respectively. Each of the first and second drive circuits 410 and 412 is configured with (i) a constant current output converter or (ii) a combination of a constant voltage output converter and a constant current circuit.

When a power voltage $V_{IN}$ is supplied to an LO terminal, the first drive circuit 410 supplies a drive current (lamp current) $I_{LAMP1}$ to the first light source 302. When the power voltage $V_{IN}$ is supplied to the LO terminal and a high level is input to an HI terminal, the second drive circuit 412 supplies a drive current $I_{LAMP2}$ to the second light source 304.

According to the vehicular lamp 300R of FIG. 1A, light sources having different rated currents may be used as the first light source 302 and the second light source 304, but since a drive circuit is required for each light source, the cost becomes high and the size increases.

In a vehicular lamp 300S of FIG. 1B, a lighting circuit 400S includes a common drive circuit 414 for two light sources 302 and 304, and a plurality of constant current circuits 420 and 422. The drive circuit 414 is a constant voltage output converter. The constant current circuit 420 is provided in series with the first light source 302 so as to stabilize the drive current $I_{LAMP1}$. Also, the constant current circuit 422 is provided in series with the second light source 304, and when the high level is input to the HI terminal, the constant current circuit 422 is turned on to stabilize the drive current $I_{LAMP2}$.

According to the vehicular lamp 300S of FIG. 1B, since only one drive circuit is sufficient, the cost may be cut down and the size may also be reduced. However, when a difference between a forward voltage $V_{F1}$ of the first light source 302 and a forward voltage $V_{F2}$ of the second light source 304 is large, a power consumption (loss) in one of the constant current circuits 420 and 422 increases.

In a vehicular lamp 300T of FIG. 1C, the rated currents of the two light sources 302 and 304 are equal, and these light sources are serially connected. The common drive circuit 414 supplies a common drive current $I_{LAMP}$ to a serially-connected circuit of the light sources 302 and 304. A bypass switch 430 is provided in parallel with the second light source 304, and a switch driver 432 turns off the bypass switch 430 when the HI terminal is at a high level. At this time, the drive current $I_{LAMP}$ is supplied to the second light source 304 so that the second light source 304 is turned on. The switch driver 432 turns on the bypass switch 430 when the HI terminal is at a low level. At this time, the drive current $I_{LAMP}$ flows in the bypass switch 430 so that the second light source 304 is turned off.

In the vehicular lamp 300T of FIG. 1C, since only one drive circuit is sufficient, the cost may be cut down and the size may also be reduced. Further, the problem of power loss as in the constant current circuit illustrated in FIG. 1B does not occur. However, since it is required to select components having similar rated currents for the first light source 302 and the second light source 304, there is a serious design restriction.

Further, although a combination of a high beam and a low beam has been described here, the same problem may occur in a combination of other light sources. See, for example, Japanese Patent Laid-open Publication No. 2006-103404.

SUMMARY

The present disclosure has been made under such a circumstance and an aspect thereof provides a lighting circuit capable of lighting a plurality of light sources.

An aspect of the present disclosure relates to a lighting circuit configured to drive a first light source and a second light source that are serially connected with each other. The lighting circuit includes: a bypass switch provided in parallel with the second light source; a constant current circuit connected in parallel with one of the first light source and the second light source; and a drive circuit configured to supply a drive current to a serially-connected circuit including the first light source and the second light source.

It is assumed that a drive current generated by the drive circuit is $I_{OUT}$ and a current generated by the constant current circuit is $I_C$. In a state in which the bypass switch is turned off, $I_{OUT}$-$I_C$ flows in one of the first light source and the second light source that are in parallel with the constant current circuit, and $I_{OUT}$ flows in the other of the light sources. Therefore, since it is possible to select components having different rated currents for the first light source and the second light source, the degree of freedom of design may be increased. In addition, since only one drive circuit is sufficient, cost reduction and miniaturization may also be achieved.

The constant current circuit may be provided in parallel with the second light source and the bypass switch. In this case, a component having a relatively large rated current may be adopted for the first light source, and a component having a relatively small rated current may be adopted for the second light source.

The constant current circuit may be provided in parallel with the first light source. In this case, a component having a relatively small rated current may be adopted for the first light source, and a component having a relatively large rated current may be adopted for the second light source.

The lighting circuit may be configured such that it is possible to switch on/off of a current of the constant current circuit, or change the amount of the current. In this case, it is possible to change the light amount of the first light source.

Interruption/conduction of the current in the constant current circuit may be controlled in association with the bypass switch. Accordingly, the light amount of the first light source may be switched in association with the on/off of the second light source.

The lighting circuit may further include a current control switch connected in series with the constant current circuit so as to form a path in parallel with the first light source. As a result, the light amount of the first light source may be changed. Alternatively, the constant current circuit may be configured to directly control the on/off.

Another aspect of the present disclosure relates to a vehicular lamp. The vehicular lamp may include a first light source and a second light source that are connected in series with each other and one of the above-described lighting circuits that drive the first light source and the second light source.

Further, any combination of the above-described components or replacement of the components or expressions of the present disclosure among a method, a device, a system, and the like is effective as an aspect of the present disclosure.

According to an aspect of the present disclosure, a plurality of light sources may be turned on.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part thereof. The illustrative embodiments described in the detailed description, drawings, and claims are not meant to be limiting. Other embodiments may be utilized, and other changes may be made, without departing from the spirit or scope of the subject matter presented here.

In the detailed description of the present disclosure, "a state in which member A is connected with member B" includes not only the case where the members A and B are physically directly connected with each other, but also the case where the members A and B are indirectly connected with each other via other members which do not substantially affect the electrical connection state of these members or do not impair a function or effect to be exhibited by a combination of these members.

Similarly, "a state in which member C is provided between member A and member B" includes, not only the case where the members A and C or the members B and C are directly connected with each other, but also the case where these members are indirectly connected with each other via other members which do not substantially affect the electrical connection state of these members or do not impair a function or effect to be exhibited by a combination of these members.

Also, herein, symbols affixed to electrical signals, such as, for example, voltage signals and current signals or circuit elements such as, for example, resistors and capacitors, may indicate voltage values, current values, resistor values, and capacity values, respectively, as needed.

Figure 1A:
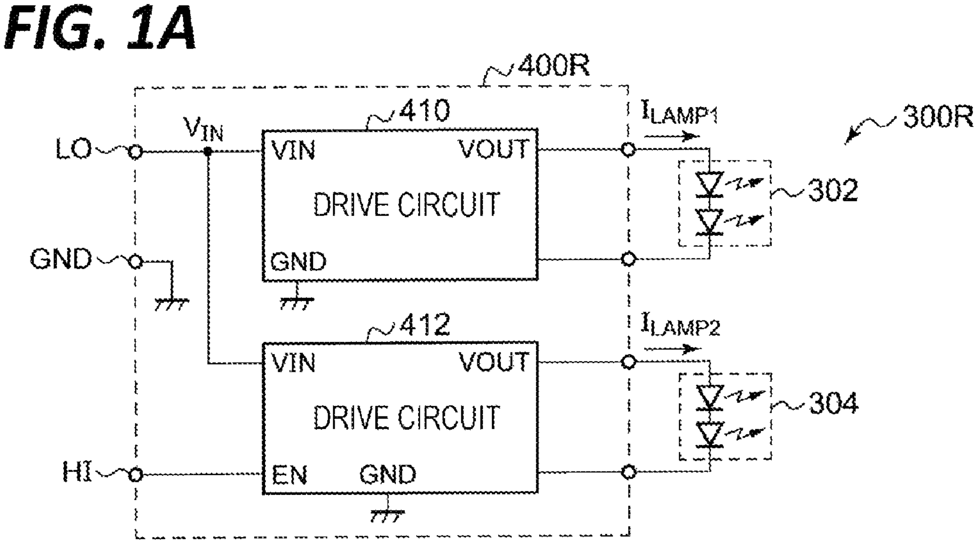
FIGS. 1A to 1C are circuit diagrams of a vehicular lamp including a plurality of light sources studied by the present inventors.
Figure 1B:
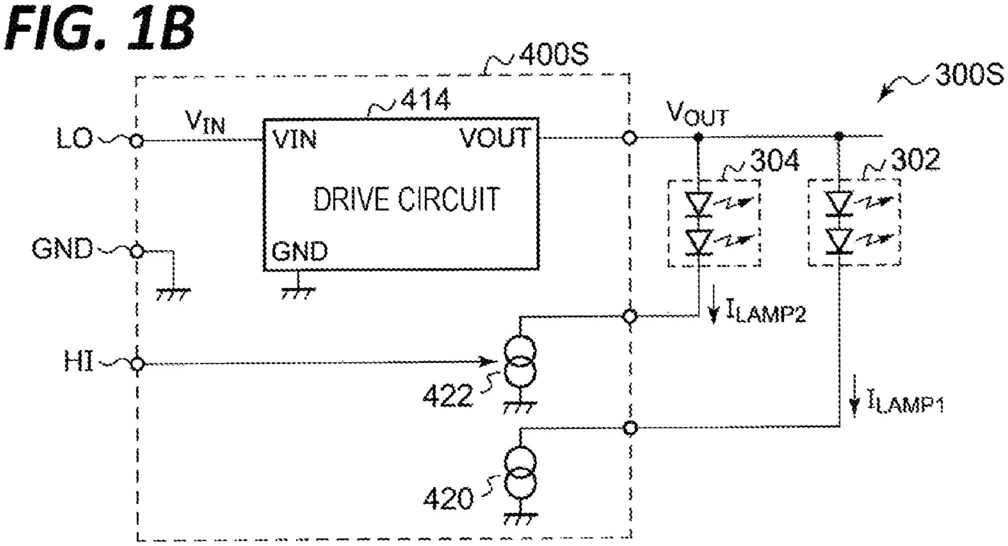
Figure 1C:
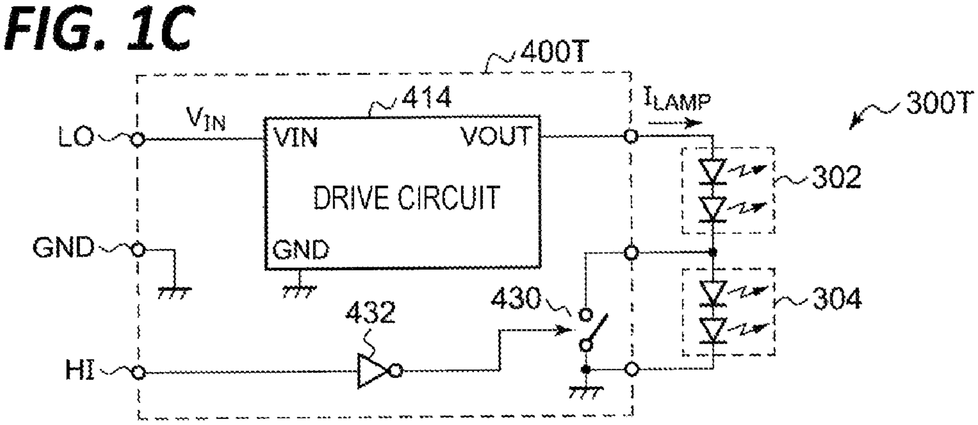
Figure 2:
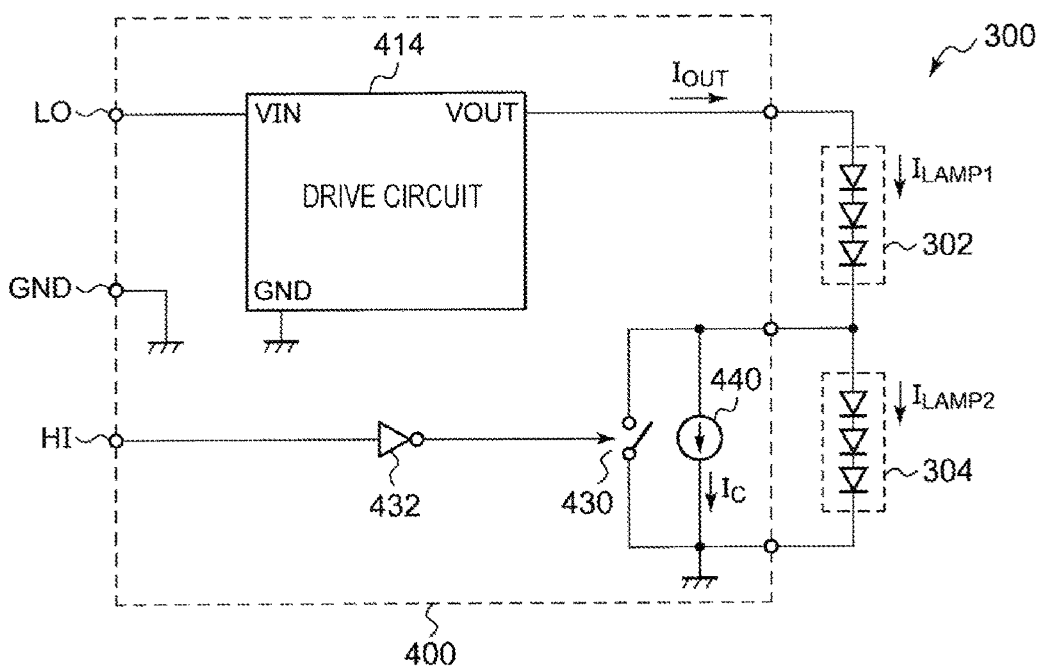
FIG. 2 is a block diagram of a vehicular lamp including a lighting circuit according to a first exemplary embodiment.

FIG. 2 is a block diagram of a vehicular lamp 300 including a lighting circuit 400 according to a first exemplary embodiment. The vehicular lamp 300 includes a first light source 302, a second light source 304, and the lighting circuit 400. Each of the first light source 302 and the second light source 304 includes one or a plurality of serially connected LEDs. The first light source 302 and the second light source 304 are serially connected with each other, and the lighting circuit 400 drives the first light source 302 and the second light source 304 that are serially connected with each other.

Although not limited thereto, in this exemplary embodiment, the first light source 302 is a light source for a low beam and the second light source 304 is a light source for a high beam. When a power voltage $V_{IN}$ (e.g., a voltage $V_{BAT}$ of a battery (not illustrated)) is supplied to an LO terminal, the lighting circuit 400 turns on the first light source 302. Further, when a high level is input to an HI terminal, the lighting circuit 400 turns on the second light source 304, and when a low level is input to the HI terminal, the lighting circuit 400 turns off the second light source 304. Apart from the supply of the power voltage $V_{IN}$ to the LO terminal, a control signal instructing the on/off of the first light source 302 may be input.

The lighting circuit 400 includes a drive circuit 414, a bypass switch 430, a switch driver 432, and a constant current circuit 440. The bypass switch 430 is provided in parallel with the second light source 304.

The constant current circuit 440 is connected in parallel with one of the first light source 302 and the second light source 304 (i.e., the second light source 304 in FIG. 2). The drive circuit 414 supplies a drive current $I_{OUT}$ to a serially-connected circuit including the first light source 302 and the second light source 304. The drive circuit 414 may be configured with a constant current converter. The constant current circuit 440 generates a constant current $I_C$. The switch driver 432 turns off the bypass switch 430 when the HI terminal is at the high level, and turns on the bypass switch 430 when the HI terminal is at the low level.

Figure 3:
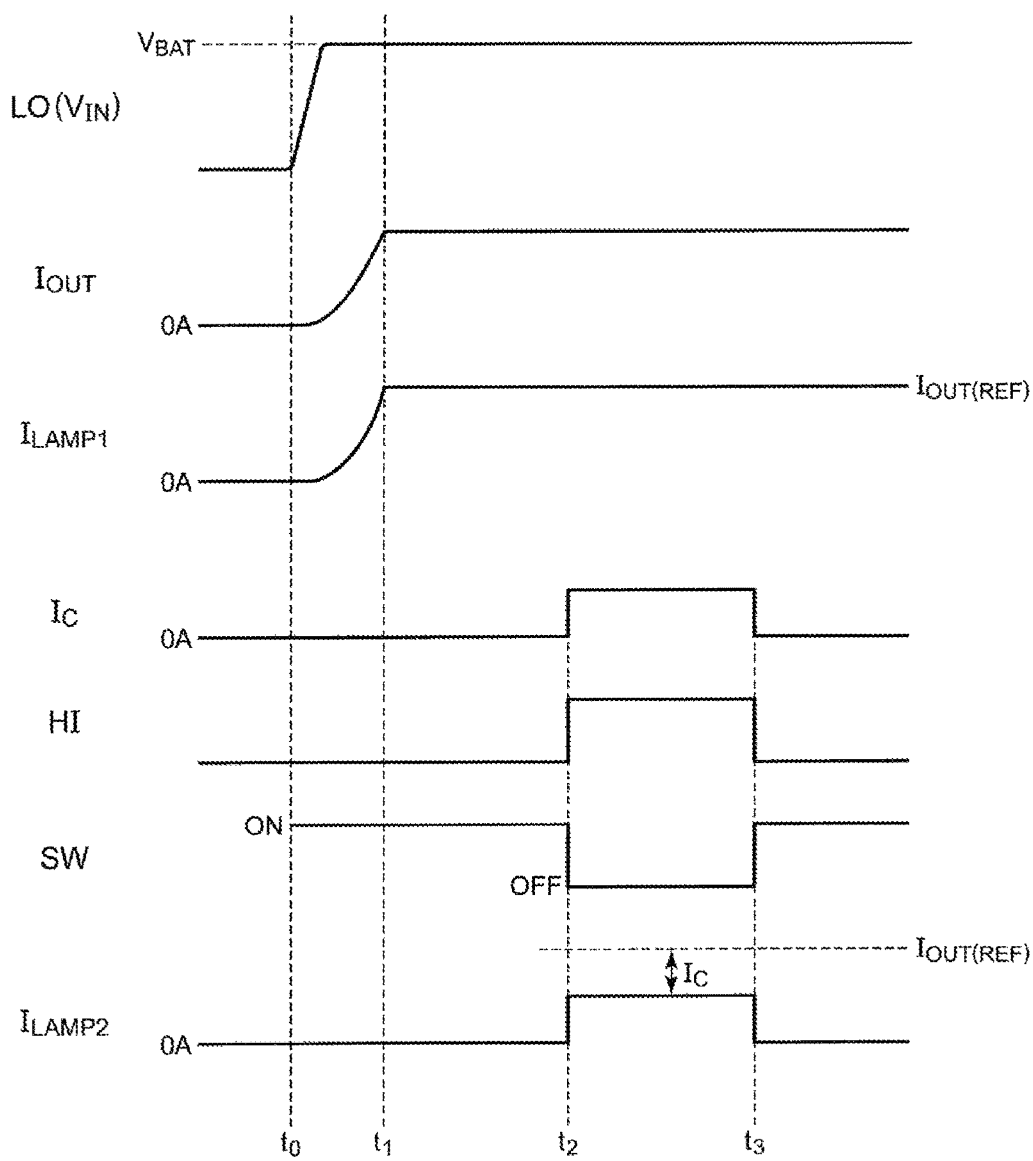
FIG. 3 is an operation waveform diagram of the vehicular lamp of FIG. 2.

A configuration of the vehicular lamp 300 has been described above. Next, an operation thereof will be described. FIG. 3 is an operation waveform diagram of the vehicular lamp 300 of FIG. 2. Before time $t_0$, the power voltage $V_{IN}$ is not supplied to the LO terminal, and both the first light source 302 and the second light source 304 are turned off. "SW" in FIG. 3 represents the on/off of the bypass switch 430.

When the power voltage $V_{IN}$ is supplied to the LO terminal at time $t_0$, the drive circuit 414 is activated, and the output current (drive current) $I_{OUT}$ thereof increases toward a target value $I_{OUT(REF)}$. The drive current $I_{OUT}$ may be increased gradually with time in the order of several hundred ms. At time t1, the drive current $I_{OUT}$ reaches the target value $I_{OUT(REF)}$.

At this time, the low level is input to the HI terminal and the bypass switch 430 is turned on. When the bypass switch 430 is turned on, the drive current $I_{OUT}$ generated by the drive circuit 414 flows through a path including the first light source 302 and the bypass switch 430. Therefore, the first light source 302 emits light at a luminance corresponding to a target current $I_{OUT(REF)}$ and the second light source 304 is turned off.

At time $t_2$, when the HI terminal is changed to the high level, the bypass switch 430 is turned off. Then, the constant current circuit 440 is operable to generate the constant current $I_C$. However, $I_C < I_{OUT(REF)}$. That is, the current $I_{OUT}$ flowing in the first light source 302 is classified into the second light source 304 and the constant current circuit 440, and therefore, the second light source 304 emits light at a luminance corresponding to a current $I_{LAMP2} = I_{OUT} - I_C$.

When the HI terminal is changed to the low level at time $t_3$, the bypass switch is turned on again, a current $I_{LAMP2}$ of the second light source 304 becomes zero, and the second light source 304 is turned off.

The operation of the vehicular lamp 300 has been described above. According to the vehicular lamp 300, components having different rated currents may be selected for the first light source 302 and the second light source 304, respectively, so that the degree of freedom of design may be increased. In addition, since only one drive circuit 414 is sufficient, cost reduction and miniaturization may be achieved.

Figure 4:
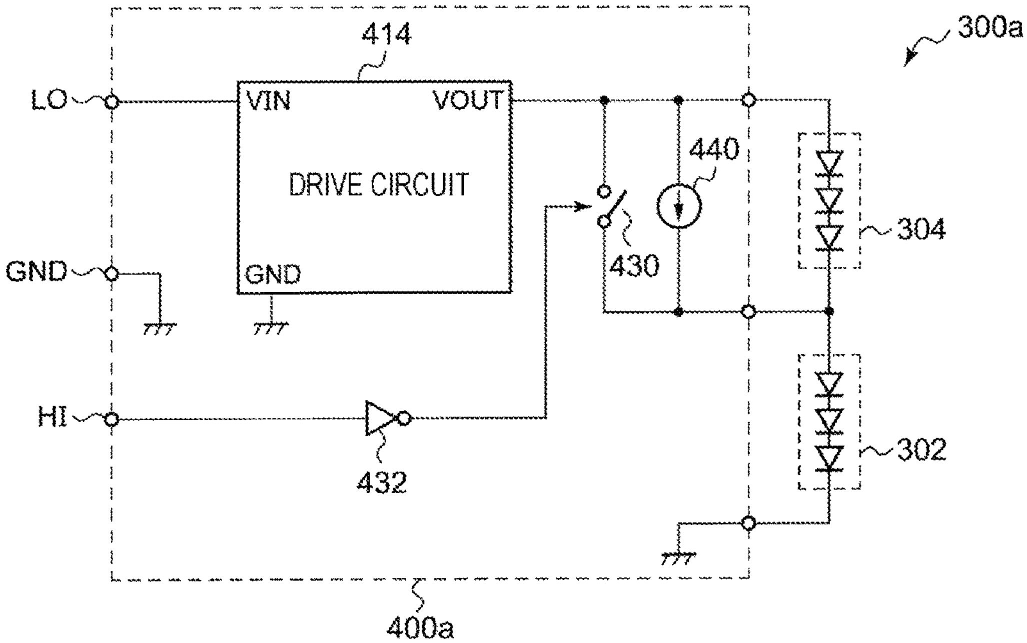
FIG. 4 is a block diagram of a vehicular lamp including a lighting circuit according to a second exemplary embodiment.

FIG. 4 is a block diagram of a vehicular lamp 300*a* including a lighting circuit 400*a* according to a second exemplary embodiment. The difference between FIG. 4 and FIG. 2 will be described. In FIG. 4, the first light source 302 is provided on a low potential side and the second light source 304 is provided on a high potential side. Therefore, the bypass switch 430 and the constant current circuit 440 are provided on the high potential side. Also, with respect to the vehicular lamp 400*a* of FIG. 4, the same effect as that of the vehicular lamp 400 of FIG. 2 may be obtained.

Figure 5:
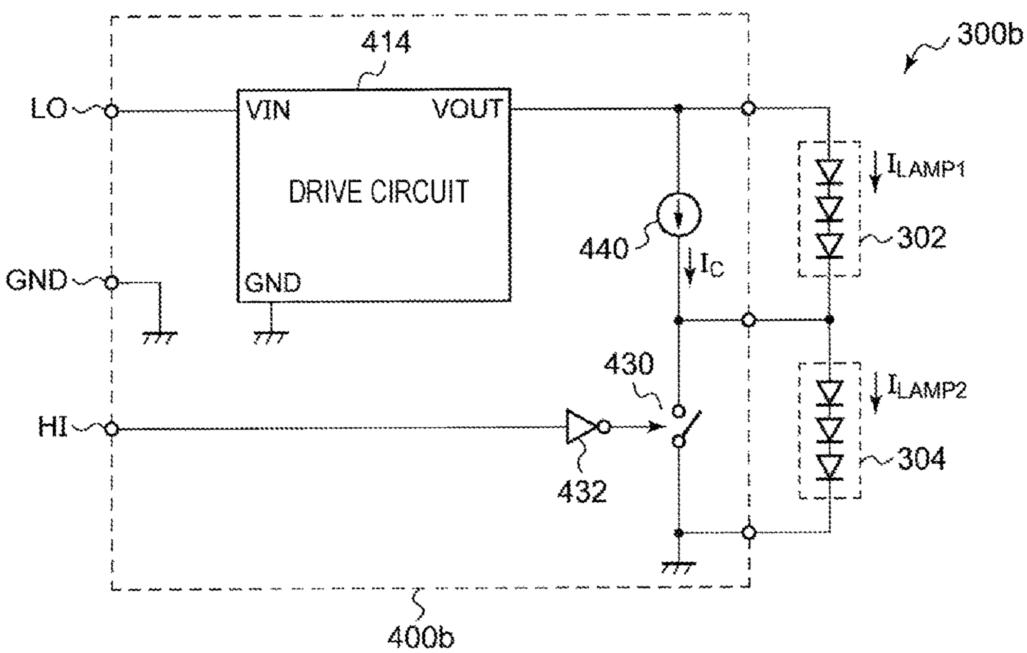
FIG. 5 is a block diagram of a vehicular lamp including a lighting circuit according to a third exemplary embodiment.

FIG. 5 is a block diagram of a vehicular lamp 300*b* including a lighting circuit 400*b* according to a third exemplary embodiment. In the vehicular lamp 400*b* of FIG. 5, the constant current circuit 440 is connected in parallel with the first light source 302 and the remaining components are the same as those of the lighting circuit 400 of FIG. 2.

In a state in which the bypass switch 430 is turned on, the drive current $I_{LAMP1} = I_{OUT} - I_C$ flows in the first light source 302 and the current $I_{LAMP2}$ of the second light source 304 is zero. When the bypass switch 430 is turned off, the drive current $I_{LAMP2} = I_{OUT}$ flows in the second light source 304. According to the lighting circuit 400*b*, a component having a large rated current may be selected for the second light source 304, and a component having a small rated current may be selected for the first light source 302.

Figure 6:
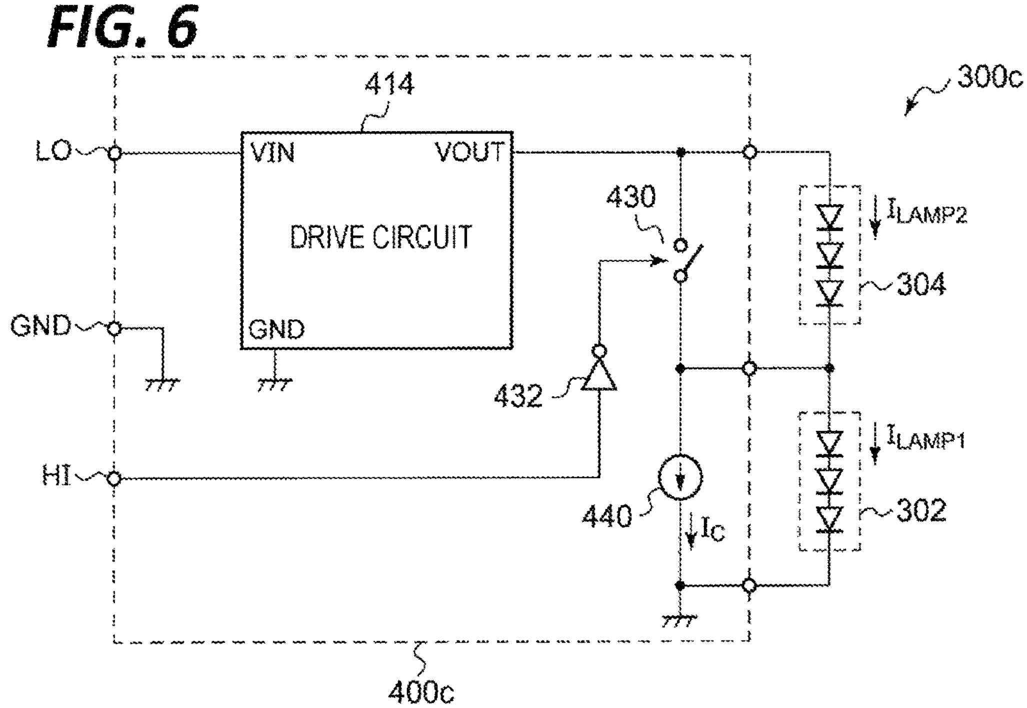
FIG. 6 is a block diagram of a vehicular lamp including a lighting circuit according to a fourth exemplary embodiment.

FIG. 6 is a block diagram of a vehicular lamp 300*c* including a lighting circuit 400*c* according to a fourth exemplary embodiment. The difference between FIG. 6 and FIG. 5 will be described. In FIG. 6, the first light source 302 is provided on a low potential side, and the second light source 304 is provided on a high potential side. Therefore, the bypass switch 430 is provided on the high potential side, and the constant current circuit 440 is provided on the low potential side. Also, with respect to the vehicular lamp 400*c* of FIG. 6, the same effect as that of the vehicular lamp 400*b* of FIG. 5 may be obtained.

Figure 7:
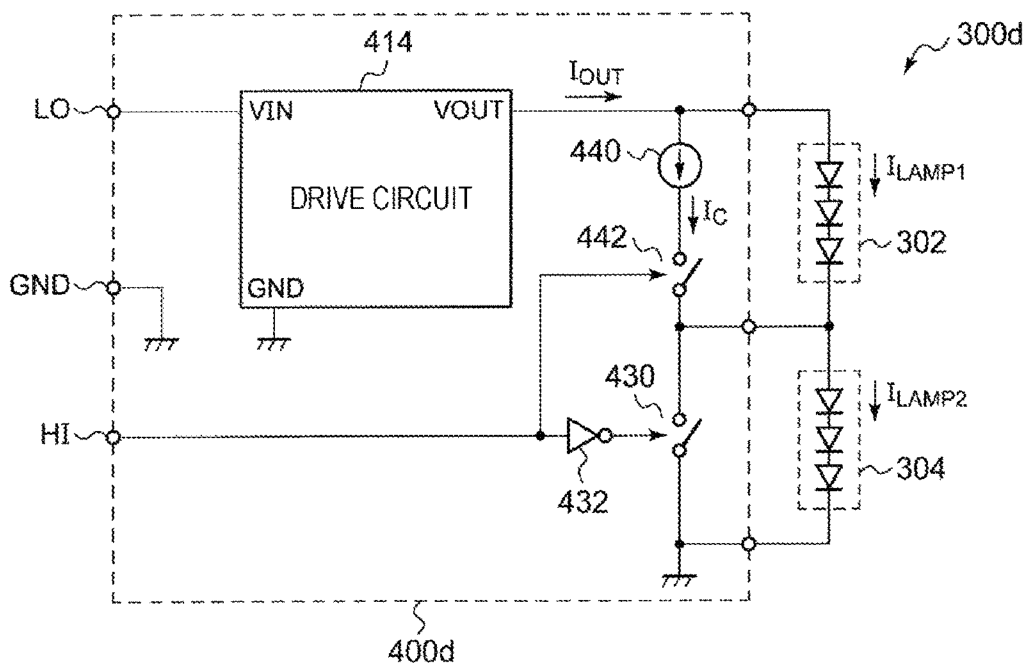
FIG. 7 is a block diagram of a vehicular lamp including a lighting circuit according to a fifth exemplary embodiment.

FIG. 7 is a block diagram of a vehicular lamp 300*d* including a lighting circuit 400*d* according to a fifth exemplary embodiment. The lighting circuit 400*d* enables switching of the on (conduction) and off (interruption) of a current $I_C$ generated by the constant current circuit 440 of the lighting circuit 400*c* of FIG. 6. For example, a current control switch 442 is inserted serially with the constant current circuit 440, and when the current control switch 443 is turned off, the current IC generated by the constant current circuit 440 is turned off.

Accordingly, when the current control switch 442 is turned off, the current $I_{LAMP1}$ of the first light source 302 is equal to the output current $I_{OUT}$ of the drive circuit 414, and when the current control switch 442 is turned on, the current $I_{LAMP1}$ becomes $I_{OUT} - I_C$ and may change the light amount of the first light source 302.

Several variations are considered for controlling the current control switch.

For example, the current control switch 442 may be controlled complementarily with the bypass switch 430. That is, when the HI terminal is at the high level, the current control switch 442 may be turned on, and when the HI terminal is at the low level, the current control switch 442 may be turned off. In this case, the luminance of a low beam at the time of turning on the high beam may be set to be lower than that at the time of turning off a high beam. This control has an advantage of capable of suppressing the heating amount of a light source when both the high beam and the low beam are turned on.

Conversely, the current control switch 442 may be controlled with the same logic as the bypass switch 430. That is, when the HI terminal is at the high level, the current control switch 442 may be turned off, and when the HI terminal is at the low level, the current control switch 442 may be turned on. In this case, the luminance of the low beam at the time of turning on the high beam may be set to be higher than that at the time of turning off the high beam.

Apart from the HI terminal, a pin (terminal) configured to control the current control switch 442 may be further added so as to make the current control switch 442 controllable independently from the bypass switch 430.

Figure 8:
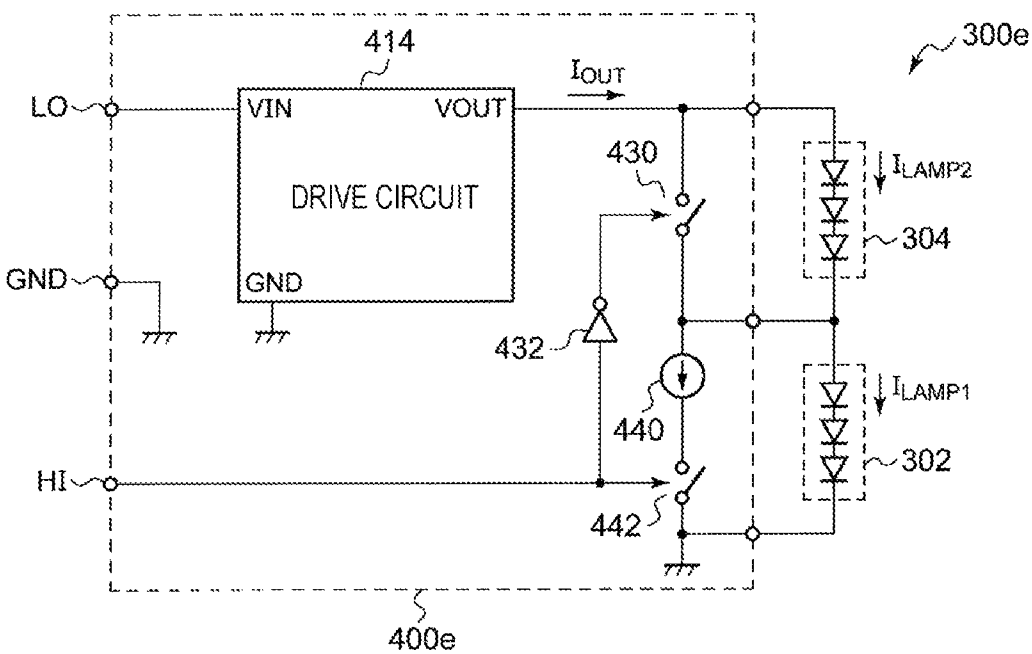
FIG. 8 is a block diagram of a vehicular lamp including a lighting circuit according to a sixth exemplary embodiment.

FIG. 8 is a block diagram of a vehicular lamp 300*e* including a lighting circuit 400*e* according to a sixth exemplary embodiment. The vehicular lamp 400*e* replaces the first light source 302 and the second light source 304 of FIG. 7. According to the vehicular lamp 400*e*, the same effect as that of the vehicular lamp 400*d* of FIG. 7 may be obtained.

Although the description of the present disclosure has been made using specific words and phrases based on the exemplary embodiments, the exemplary embodiments merely represent the principle and application of the present disclosure. Further, many modified examples or changes of arrangement are perceived from the exemplary embodiments within the scope of not deviating from the idea of the present disclosure defined in the claims.

The light sources 302 and 304 may be LDs or organic electroluminescence (EL) without being limited to LEDs. Further, the drive circuit 414 may be configured by a linear regulator or other circuits without being limited to a switching converter.

In the exemplary embodiments, a combination of the high beam and the low beam has been described. However, without being limited thereto, the present disclosure may also be applicable to (i) a combination of a main low beam and an additional low beam, (ii) a combination of a clearance lamp and a fog lamp, (iii) a combination of a turn lamp and a daytime running lamp (DRL), and the like.

The constant current circuit 440 may be configured by a variable current source.

In the exemplary embodiments, two light sources 302 and 304 are serially connected, but three or more light sources may be serially connected.

From the foregoing, it will be appreciated that various embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A lighting circuit comprising:

a first light source;

a second light source connected in series with the first light source to form a serially-connected circuit;

a bypass switch provided in parallel with the second light source;

a constant current circuit connected in parallel with only one of the first light source or the second light source at a time and configured to generate a constant current; and a drive circuit configured to supply a drive current to the serially-connected circuit including the first light source and the second light source, wherein the drive circuit is only directly connected to an input of the first light source of the serially-connected circuit including the first light source and the second light source.

2. The lighting circuit of claim 1, wherein the constant current circuit is provided in parallel with the second light source and in parallel with the bypass switch.

3. The lighting circuit of claim 1, wherein the constant current circuit is provided in parallel with the first light source.

4. The lighting circuit of claim 3, wherein on/off of a current of the constant current circuit is configured to be switchable.

5. The lighting circuit of claim 4, wherein the on/off of the current of the constant current circuit is switchable in association with the bypass switch.

6. The lighting circuit of claim 5, wherein the on/off of the current of the constant current circuit is controlled complementarily with on/off of the bypass switch.

7. The lighting circuit of claim 4, further comprising:

a current control switch connected in series with the constant current circuit so as to form a path that is in parallel with the first light source.

8. The lighting circuit of claim 5, further comprising:

a current control switch connected in series with the constant current circuit so as to form a path that is in parallel with the first light source.

9. A vehicular lamp comprising:

the lighting circuit of claim 1 that drives the first light source and the second light source.

10. The lighting circuit of claim 1, further comprising:

a switch driver configured to turn off the bypass switch when an input terminal is at a high level, and turn on the bypass switch when the input terminal is at a low level.

11. The lighting circuit of claim 1, wherein components having different rated currents are selected for the first light source and the second light source, respectively.

12. The lighting circuit of claim 1, wherein the drive circuit is a constant voltage output converter.

13. The lighting circuit of claim 2, wherein the constant current circuit only generates constant current when the bypass switch is turned off.

14. The lighting circuit of claim 3, wherein the constant current circuit only generates constant current when the bypass switch is turned on.

* * * * *